United States Patent [19]

Aoki et al.

[11] Patent Number: 5,090,459
[45] Date of Patent: Feb. 25, 1992

[54] FUEL TANK SYSTEM

[75] Inventors: Tomohide Aoki, Gifu; Hisao Hanabusa, Bisai; Tamiyosi Ohasi; Masakiyo Yoshida, both of Aichi; Masami Mizuno, Nagoya; Fujio Ninomiya, Aichi; Osamu Hokari, Kanagawa; Tsugio Fujita, Yokohama, all of Japan

[73] Assignees: Toyoda Gosei Co., Ltd., Nishikasugai; Isuzu Motors Limited, Tokyo, both of Japan

[21] Appl. No.: 647,666

[22] Filed: Jan. 29, 1991

[30] Foreign Application Priority Data

Jan. 29, 1990 [JP] Japan .................. 2-19936
Mar. 16, 1990 [JP] Japan .................. 2-67466

[51] Int. Cl.⁵ .................................... B60K 15/02
[52] U.S. Cl. .................................... 141/59; 141/98; 141/311 A; 141/87; 141/392; 141/303; 220/746; 220/86.2; 220/DIG. 33; 296/97.22
[58] Field of Search ............... 141/59, 51, 52, 349, 141/350, 98, 311 A, 325, 326, 286, 307, 301–303, 392, 86–88; 296/97.22; 137/312–314; 220/86.1, 86.2, 746, 728, 367, 368, DIG. 33; 123/195 C, 198 E

[56] References Cited

U.S. PATENT DOCUMENTS

| | | | |
|---|---|---|---|
| 3,071,285 | 1/1963 | Friend | 220/86.2 X |
| 3,291,165 | 12/1966 | Fraylick | 141/311 A X |
| 3,712,330 | 1/1973 | Davis | 137/312 |
| 4,013,105 | 3/1977 | Uuskallio | 141/86 |
| 4,481,977 | 11/1984 | Maldavs | 141/326 X |
| 4,494,585 | 1/1985 | Waldecker | 141/98 |
| 4,651,889 | 3/1987 | Uranishi et al. | |
| 4,659,346 | 4/1987 | Uranishi et al. | 296/97.22 X |
| 4,702,386 | 10/1987 | Boehmer et al. | |
| 4,759,458 | 7/1988 | Fischer | 220/86.2 |
| 4,817,691 | 4/1989 | Lau | 141/86 X |
| 4,830,067 | 5/1989 | Foutch | 141/86 |
| 5,058,633 | 10/1991 | Sharp | 141/86 |

FOREIGN PATENT DOCUMENTS

| | | | |
|---|---|---|---|
| 1122520 | 9/1956 | France | 296/97.22 |
| 50-145922 | 12/1975 | Japan . | |
| 63-82823 | 4/1988 | Japan | 296/97.22 |
| 1-91626 | 6/1989 | Japan . | |
| 1-96336 | 6/1989 | Japan . | |

Primary Examiner—Henry J. Recla
Assistant Examiner—Casey Jacyna
Attorney, Agent, or Firm—Cushman, Darby & Cushman

[57] ABSTRACT

A fuel tank system has a fuel tank, a fuel charging port extending from the fuel tank and disposed in the vicinity of an outer panel of a body and a fuel lid for covering the fuel charging port. The fuel lid is mounted such that it is movable substantially horizontally relative to a portion of the outer panel of the body corresponding to the fuel charging port and that a distal end of the fuel lid is capable of moving away from the fuel charging port and the outer panel. A fuel passage having an outlet disposed on a rear surface side of said fuel lid in such a manner as to be oriented downwardly is disposed in such a manner as to extend from said fuel tank. This fuel passage allows a liquid fuel overflowing during overfueling to flow.

15 Claims, 14 Drawing Sheets

FUEL TANK SYSTEM

BACKGROUND OF THE INVENTION

1. Field of the Invention

The present invention relates to a fuel tank system for allowing fuel overflowing from a fuel tank of a vehicle to escape to outside the vehicle. More particularly, the present invention concerns a fuel tank system operative when fuel is supplied excessively to a vehicle tank this, occurrence being hereinafter referred to as "during overfueling" owing to a malfunctioning of an automatic shutoff mechanism of a fuel nozzle or for other reason.

2. Description of the Prior Art

Generally, a fuel nozzle is provided with an automatic shutoff mechanism. The automatic shutoff mechanism prevents fuel from being supplied excessively to the tank.

However, there are cases where the automatic shutoff mechanism fails to operate properly. For this reason, there arises the need for the pump operator to constantly monitor the situation of fueling. As a result, the operation of supplying fuel into the tank has been troublesome.

For instance, if the operator neglects the monitoring, the fuel can overflow from a fuel charging port with the fuel nozzle inserted therein, running down an outer panel of a body. As a result, the painting of the outer panel becomes discolored.

In addition, at the fuel charging port with a fuel recovery valve attached to its inner peripheral surface, it is impossible for the operator to visually ascertain the internal situation through that fuel charging port (refer to U.S. Pat. No. 4,702,386, Japanese Utility-Model Application Laid-Open No. 145922/1975, etc.). For this reason, in the structure in which the fuel recovery valve is provided, the aforementioned problem is liable to occur when the automatic shutoff mechanism of the fuel nozzle has failed.

SUMMARY OF THE INVENTION

An object of the present invention is to provide a fuel tank system which is capable of preventing liquid fuel overflowing from running down an outer panel of a body during overfueling.

Another object of the present invention is to provide a fuel tank system which is capable of preventing the discoloration of an outer panel of a body due to liquid fuel during overfueling.

Still another object of the present invention is to provide a fuel tank system which is free of the possibility of causing overflowing liquid fuel to be splashed onto an operator.

To these ends, in accordance with the present invention there is provided a fuel tank system for use during overfueling, comprising: a fuel tank disposed in a body; a fuel charging port extending from the fuel tank and disposed in the vicinity of an outer panel of the body; a fuel lid disposed in such a manner as to cover the fuel charging port and mounted in such a manner that the fuel lid is movable substantially horizontally relative to a portion of the outer panel of the body corresponding to the fuel charging port and that a distal end of the fuel lid is capable of moving away from the fuel charging port and the outer panel; and a fuel passage having an outlet disposed on a rear surface side of the fuel lid in such a manner a to be oriented downwardly, the fuel passage extending from the fuel tank and provided to allow a liquid fuel overflowing during overfueling to flow.

With the fuel tank system in accordance with the present invention, the outlet of the fuel passage extending from the fuel tank so as to allow an overflowing liquid fuel to flow therethrough is mounted on the rear surface side of the fuel lid in such a manner as to be oriented downwardly.

That is, when the liquid fuel is charged into the fuel tank through the fuel charging port, the fuel charging port is first opened. At that time, the fuel lid covering the fuel charging port is rotated, and the distal end of the fuel lid is moved away from the outer panel of the body. Subsequently, the liquid fuel is charged through the fuel charging port. When the fuel is supplied excessively during fueling, the liquid fuel which has overflowed flows out downwardly through the outlet of the fuel passage via the fuel passage.

At that juncture, the distal end of the fuel lid which was rotated at the time of fueling is spaced apart from the outer panel of the body. Consequently, the liquid fuel flowing out through the outlet of the fuel passage provided on the rear surface side of the fuel lid flows out by being located away from the body. As a result, the liquid fuel flowing out through the outlet is virtually prevented from being splashed onto the outer panel of the body. In addition, the possibility of the painting of the vehicle body being discolored due to the overflowing liquid fuel is obviated.

Furthermore, since the overflowing liquid fuel flows out from the fuel lid by being oriented downwardly, the overflowing liquid fuel is prevented from being splashed onto the operator.

The above and other objects, features and advantages of the present invention will become more apparent from the following detailed description of the invention when read in conjunction with the accompanying drawings.

DESCRIPTION OF THE PREFERRED EMBODIMENTS

Referring now to the accompanying drawing, a description will be given of the embodiments of the present invention. It should be noted that the present invention is not restricted to the embodiments, and that all modifications within the requirements of the appended claims or equivalents pertaining to the requirements are embraced within the scope of the appended claims.

Figure 1:
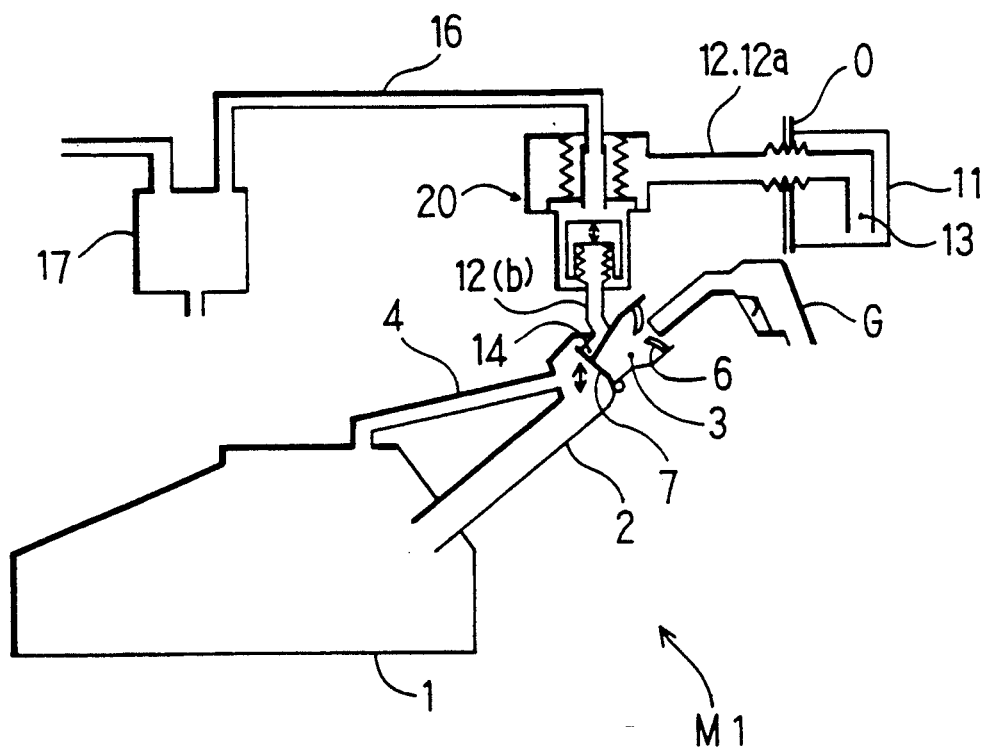
FIG. 1 is a schematic diagram illustrating a fuel tank system in accordance with a first embodiment of the present invention.

A fuel tank system M1 in accordance with a first embodiment has a fuel tank 1 disposed in a body, as shown in FIG. 1.

A filler neck 2 extending diagonally upward is formed at an upper portion of the fuel tank 1. The filler neck 2 has a fuel charging port 3 at its upper portion.

Figure 3:
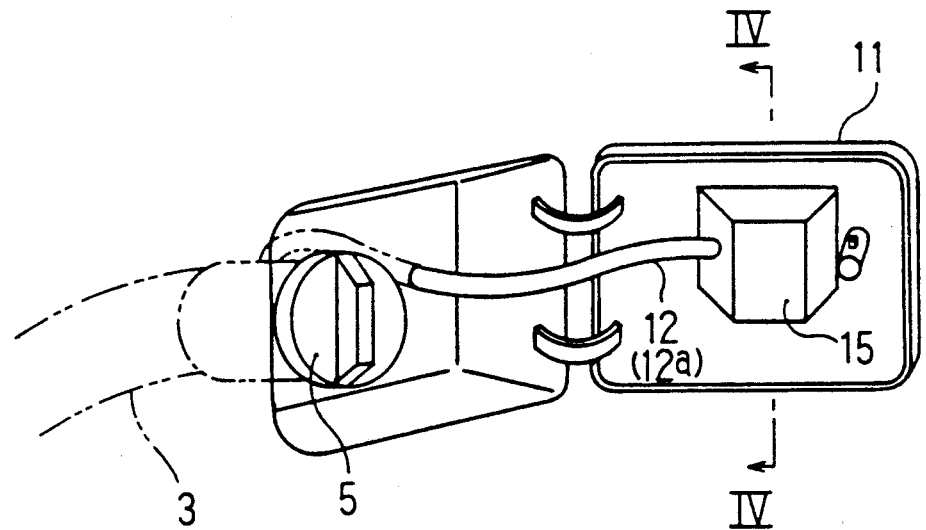
FIG. 3 is a perspective view illustrating the fuel lid of the first embodiment.

The fuel charging port 3 is disposed by being fixed to the vicinity of an outer panel 0 of the body, as shown in FIG. 3. Reference numeral 5 denotes a fuel cap for closing the fuel charging port 3. A fuel recovery valve 6 is provided on an inner peripheral surface of the fuel charging port 3, as shown in FIG. 1. This fuel recovery valve 6 serves to close a space between the fuel nozzle G inserted at the time of fueling and the inner peripheral surface of the fuel charging port 3.

A trap door 7 for closing a lower portion of the fuel charging port 3 is provided in a lower portion of the fuel recovery valve 6 in the filler neck 2. This trap door 7 is urged by an unillustrated urging means such as torsion spring in such a manner as to close the fuel charging port 3. The trap door 7 is so arranged that as the fuel nozzle G is inserted into the fuel charging port 3, the trap door 7 is pushed by the fuel nozzle G so as to open the lower portion of the fuel charging port 3.

A breather tube 4, which is connected to an upper portion of the fuel tank 1, is connected to the filler neck 2 at a position below the trap door 7. This breather tube 4 is a passage for introducing fuel vapor V inside the fuel tank 1 to a canister 17 during fueling.

In addition, a fuel lid 11 is disposed on the outer panel 0 of the body in the vicinity of the fuel charging port 3, as shown in FIG. 3. The fuel lid 11 is mounted in such a manner as to rotate in a substantially horizontal direction by means of a predetermined hinge mechanism.

Additionally, the fuel lid 11 is mounted on the outer panel 0 such that the fuel lid 11 is capable of rotating between predetermined positions. In this case, the predetermined positions means two positions, i.e., a position for covering the fuel charging port 3 and another position in which a distal end of the fuel lid 11 is spaced apart from the fuel charging port 3 and the outer panel 0.

Figure 4:
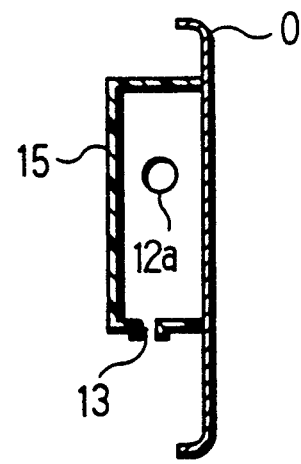
FIG. 4 is a cross-sectional view taken along the line IV—IV of FIG. 3.

The fuel tank system M1 in accordance with the first embodiment is provided with a fuel passage 12. This fuel passage 12 extends from a lower portion of the fuel charging port 3 of the filler neck 2 and communicates with a rear surface of the fuel lid 11. An outlet 13 of the fuel passage 12 on the fuel lid 11 side is oriented downwardly via an accumulator 15 (see FIG. 4). In addition, an inlet 14 of the fuel passage 12 on the fuel tank 1 side is disposed at a position where it is closed by the trap door 7 simultaneously as the fuel charging port 3 is closed by the trap door 7. Additionally, the inlet 14 is disposed at a position where it is opened by the trap door 7 simultaneously as the trap door 7 opens the fuel charging port 3 by being pushed by the fuel nozzle G.

A passage 16 is connected to the fuel passage 12 in such a manner as to branch off midway of the fuel passage 12. An outlet of the branch passage 16 is connected to the canister 17. In addition, a three-way valve 20 is disposed at a branching point of the fuel passage 12 where the branch passage 16 branches off.

Figure 5:
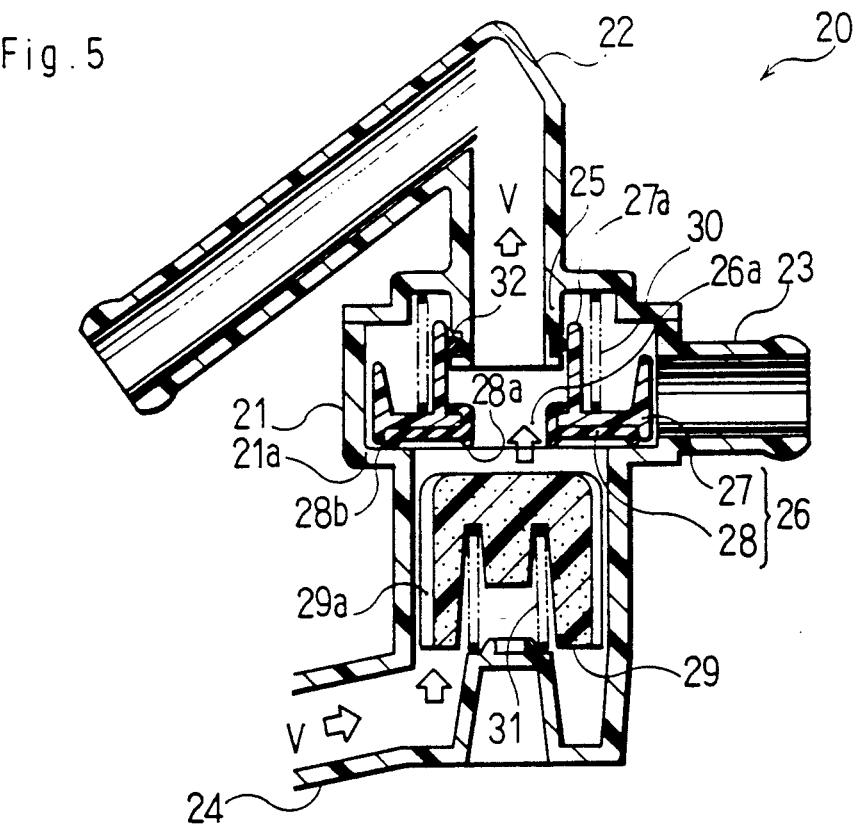
FIG. 5 is a cross-sectional view of a three-way valve used in the first embodiment during normal fueling.

The three-way valve 20 has a substantially cylindrical case 21 constituting a peripheral wall, as shown in FIG. 5. A nipple 22, which serves as a connecting portion for being connected to the branch passage 16, is formed on an upper portion of the case 21. A nipple 23, which serves as a connecting portion for being connected to a passage 12a of the fuel passage 12 on the fuel lid 11 side, is formed on a side portion of the case 21. A nipple 24, which serves as a connecting portion for being connected to a passage 12b of the fuel passage 12 on the fuel tank 1 side, is formed in a lower potion of the case 21. Additionally, a downwardly extending cylindrical portion 25 is formed on an inner peripheral surface of an upper portion of the case 21 in such a manner as to communicate with the branch-side nipple 22.

In addition, a liquid-fuel valve 26 and a float valve 29 are disposed in the case 21.

The liquid-fuel valve 26 extends from an inner peripheral surface of the case 21 corresponding to a lower portion of the lid-side nipple 23 to an outer peripheral surface of the cylindrical portion 25. In addition, the liquid-fuel valve 26 is disposed in such a manner as to shut off the state of communication between the space in the cylindrical portion 25 and the space in the lid-side nipple 23.

This liquid-fuel valve 26 comprises a substantially annular retainer 27 and a substantially annular seal portion 28 made of rubber. The retainer 27 has a cylindrical portion 27a on its inner periphery side. The seal portion 28 is affixed to the underside of the retainer 27. Ribs 28a, 28b are formed on the inner peripheral edge and outer peripheral edge of the seal portion 28, respectively, in such a manner as to project downwardly over the entire circumferences thereof.

The liquid-fuel valve 26 is pressed downwardly by a compression coil spring 30 disposed in the case 21. This spring 30 causes the rib 28b of the seal portion 28 to be held in close contact with an upper surface of a stepped portion 21a formed on an inner peripheral surface of the case 21. It should be noted that this stepped portion 21a is formed on the inner peripheral surface of the case 21 over the entire circumference thereof at a position corresponding to a lower portion of the lid-side nipple 23. In addition, an O-ring 32 is fitted around the outer peripheral surface of the cylindrical portion 25. This O-ring 32 maintains gas-tightness between the cylindrical portion 27a of the retainer 27 and the cylindrical portion 25.

The float valve 29 is disposed below the liquid-fuel valve 26. This float valve 29 is disposed with a space between the same and an inner peripheral surface of a lower portion of the case 21. A plurality of ribs 29a are formed on an outer peripheral surface of the float valve 29. The ribs 29a are formed to provide a space between the same and the inner peripheral surface of the case 21. Disposed underneath the float valve 29 is a compression coil spring 31 in such a manner as to be interposed between the float valve 29 and the case 21.

The float valve 29 is arranged such that its apparent specific gravity becomes smaller than that of the liquid fuel owing to the urging force of the coil spring 31. For this reason, when the liquid fuel has entered the case 21 via the tank-side nipple 24, the float valve 29 is lifted as the level of the liquid fuel rises. Then, the upper surface of the float valve 29 is brought into close contact with the rib 28a of the seal portion 28 of the liquid-fuel valve 26.

A description will now be given of the operation of the fuel tank system M1 in accordance with the first embodiment.

First, the fuel lid 11 is opened, the fuel cap 5 is then removed, and the fuel nozzle G is inserted into the fuel charging port 3. Then, the trap door 7 is pushed by the fuel nozzle G, which causes the lower portion of the fuel charging port 3 and the inlet 14 of the fuel passage 12 to open. For that reason, if the liquid fuel is allowed to flow out through the fuel nozzle G, the liquid fuel is supplied to the interior of the fuel tank 1.

During normal fueling, the three-way valve 20 is in the state shown in FIG. 5. That is, the float valve 29 remains lowered in the case 21, the upper surface of the float valve 29 being spaced apart from the rib 28a of the seal portion 28 of the liquid-fuel valve 26.

Consequently, fuel vapor V flows through the breather tube 4 and enters the passage 12b of the fuel passage 12 via the inlet 14. As shown in FIG. 5, the fuel vapor V then enters the interior of the case 21 of the three-way valve 20 through the tank-side nipple 24 and flows into the branch passage 16 through the three-way valve 20 via the space between the float valve 29 and the inner peripheral surface of the case 21, the central through-hole 26a of the liquid-fuel valve 26, the cylindrical portion 25, and the branching-side nipple 22, thereby flowing to the canister 17.

Inside the three-way valve 20, the liquid-fuel valve 26 causes the rib 28b of the seal portion 28 to be held in close contact with the stepped portion 21a of the case 21. Furthermore, the liquid-fuel valve 26 causes the cylindrical portion 27a of the retainer 27 to be held in close contact with the cylindrical portion 25 via the O-ring 32. As a result, the liquid-fuel valve 26 is disposed in such a manner as to shut off communication between the space in the cylindrical portion 25 and the space in the lid-side nipple 22. For the reason, the fuel vapor V is prevented from entering the fuel lid-side passage 12a of the fuel passage 12 inside the three-way valve 20.

Figure 6:
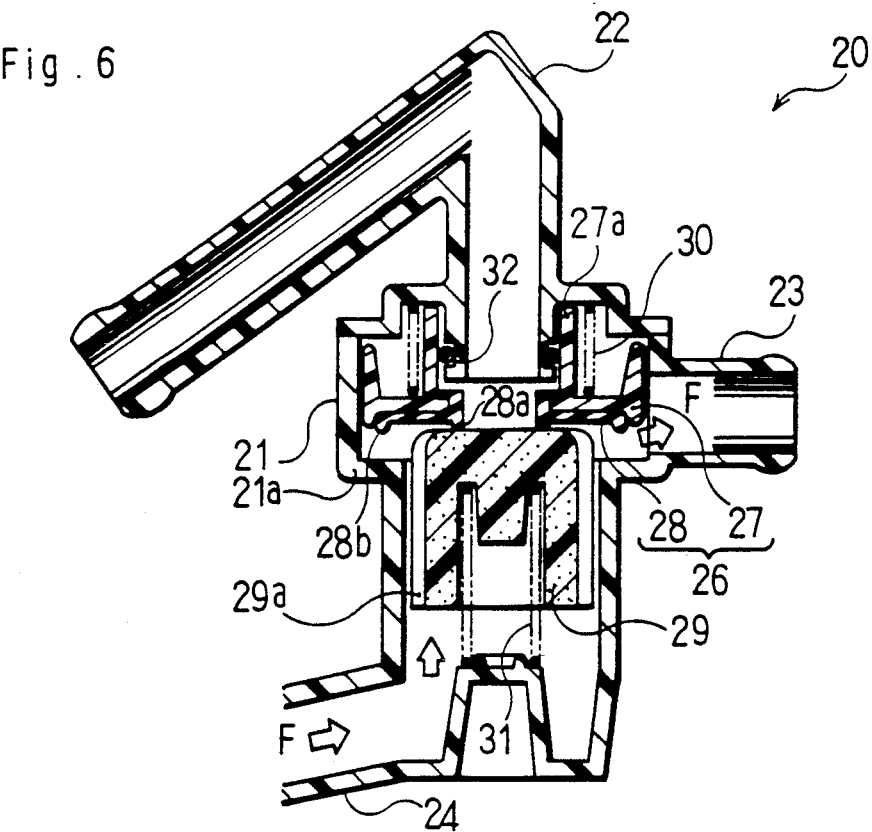
FIG. 6 is a cross-sectional view of the three-way valve used in the first embodiment during overfueling.

Meanwhile, during overfueling, the liquid fuel F flows through the filler neck 2 and the breather tube 4 and into the passage 12b of the fuel passage 12 via the inlet 14. The liquid fuel F then enters the case 21 of the three-way valve 20 through the tank-side nipple 24, as shown in FIG. 6. Consequently, the float valve 29 is lifted as the level of the liquid fuel F rises. The upper surface of the float valve 29 is brought into close contact with the rib 28a of the seal portion 28 of the liquid-fuel valve 26. The liquid-fuel valve 26 is lifted by the float valve 29 as the level of the liquid fuel F rises. Then, the rib 28b of the seal portion 28 is spaced apart from the stepped portion 21a of the case 21. For this reason, the liquid fuel F which has entered the interior of the case 21 does not flow into the cylindrical portion 25 but flows into the passage 12a of the fuel passage 12 via the lid-side nipple 23. The liquid fuel F which has flowed into the passage 21a then flows downwardly through the outlet 13 via the accumulator 15 (see FIG. 2).

At this time, the distal end of the fuel lid 11 which is open is spaced apart from the outer panel 0. Consequently, the liquid fuel F flowing downward through the outlet 13 is prevented from being splashed onto the outer panel 0. In addition, since the liquid fuel F flows downwardly through the outlet 13, it is possible to prevent the liquid fuel F from being splashed onto the operator.

It should be noted that in the first embodiment there has been shown an arrangement in which the accumulator 15 is disposed on the outlet 13 side of the fuel passage 12. However, the fuel lid-side passage 12a may be arranged in the fuel passage 12 without providing the accumulator 15.

In addition, the passage 12a on the outlet 13 side and the accumulator 15 may be formed of a transparent or semitransparent material. If such an arrangement is provided, it is possible to ascertain the state of overfueling before the liquid fuel begins to flow out through the outlet 13.

Figure 7:
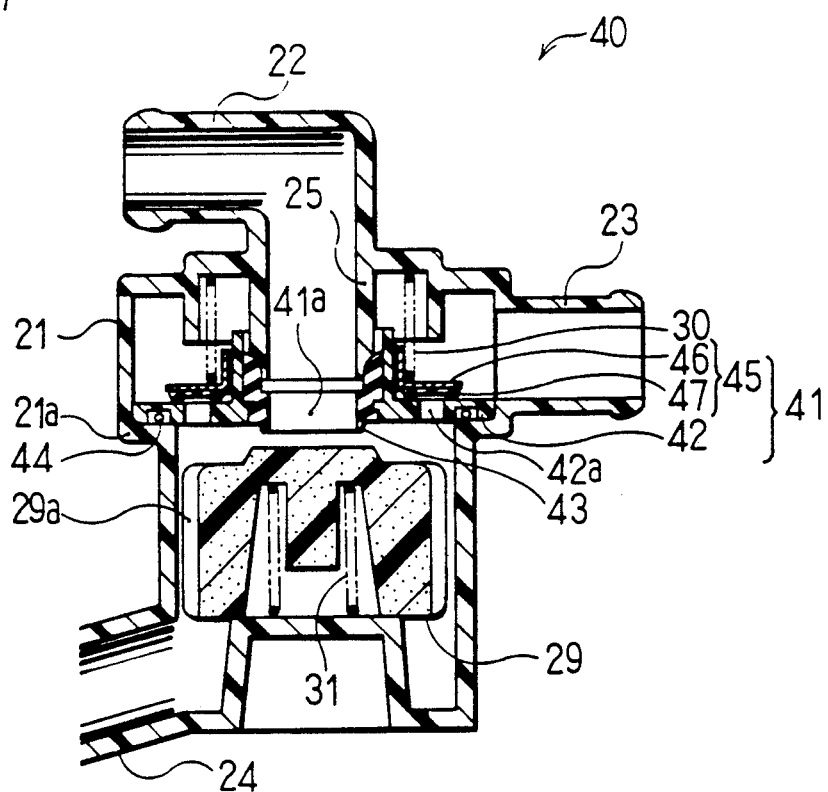
FIG. 7 is a cross-sectional view illustrating a modification of the three-way valve.
Figure 8:
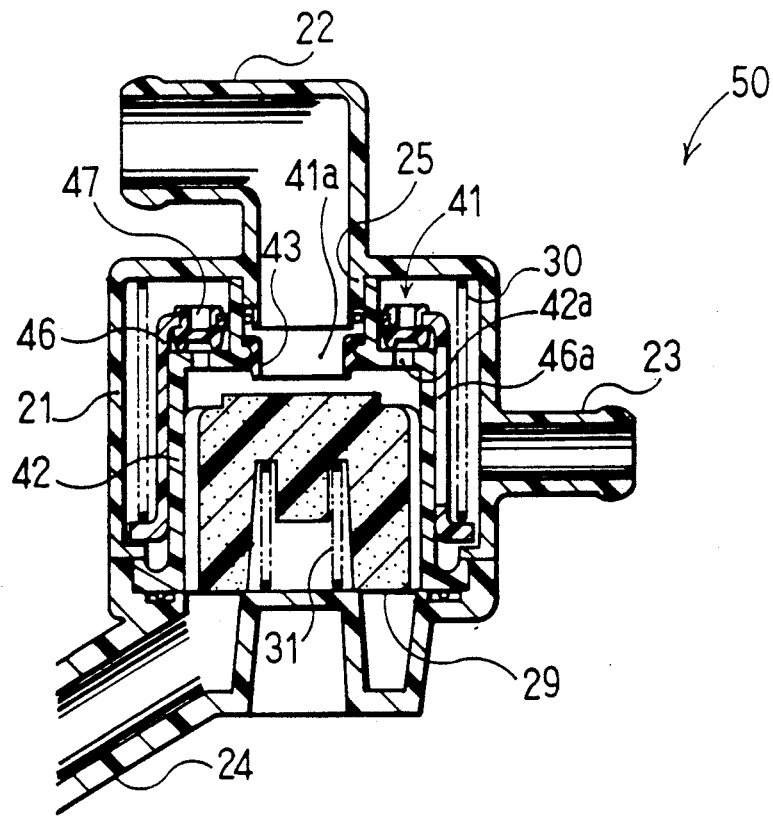
FIG. 8 is a cross-sectional view illustrating another modification of the three-way valve.

Furthermore, the structures shown in FIGS. 7 and 8 may be adopted as the structure of the three-way valve.

A three-way valve 40 shown in FIG. 7 has the substantially cylindrical case 21 having the stepped portion 21a in the same way as the three-way valve 20. The case 21 is provided with the nipple 22 connected to the branch passage 16, the nipple 23 connected to the fuel passage 12a on the lid 11 side, the nipple 24 connected to the fuel passage 12b on the tank 1 side, and the cylindrical portion 25 adapted to communicate with the nipple 22.

In addition, disposed in the lower portion of the case 21 is the float valve 29 which is urged upwardly by means of the compression coil spring 31. Additionally, a liquid-fuel valve 41 for closing the state of communication between the space in the cylindrical portion 25 and the space in the lid-side nipple 22.

This liquid-fuel valve 41 comprises a valve seat 42 and a valve element 25. The valve seat 42 is fixed to the case 21. This valve seat 42 has a cylindrical seal portion 43 made of rubber and annular packing 44 which are disposed between the outer peripheral surface of the cylindrical portion 25 and the upper surface of the stepped portion 21a. A plurality of through-holes 42a are formed in the valve seat 42 in such a manner as to extend vertically therethrough. The valve element 45 has an annular retainer 46 and an annular seal portion 47 formed of rubber and provided to the underside of the retainer 46. The seal portion 47 has a pair of ribs projecting downwardly from its inner and outer peripheral edges, respectively. The valve element 45 is urged downwardly by means of the compression coil spring 30. As a result, the seal portion 47 is capable of closing the through-holes 42a provided in the valve seat 42.

In a normal fueling state, this three-way valve 40 is in the state shown in FIG. 7. At the time when the fuel vapor has entered the interior of the case 21 through the tank-side nipple 24, the fuel vapor enters the branch passage 16 through the three-way valve 40 via the space between the float valve 29 and the inner peripheral surface of the case 21, a central through-hole 41a formed in the liquid-fuel valve 41, the cylindrical portion 25, and the branching-side nipple 22.

In addition, at the time when the liquid fuel has entered the interior of the case 21 through the tank-side nipple 24 during overfueling, the float valve 29 is lifted as the level of the liquid fuel rises. Then, the upper surface of the float valve 29 is brought into close contact with the seal portion 43 of the liquid-fuel valve 41, and closes the passage to the interior of the cylindrical portion 25. As more liquid fuel enters the case 21, the valve element 45 is pushed upwardly. Then, the liquid fuel flows into the lid-side nipple 23 via the through-holes 42a and further into the passage 12a.

A three-way valve 50 shown in FIG. 8 is arranged such that the valve seat 42 of the liquid-fuel valve 41 in the three-way valve 40 shown in FIG. 7 extends to a bottom wall of the case 21. In addition, the retainer 46 of the valve element 45 has a through-hole 46a. A lower portion of this retainer 46 is formed in such a manner as to conform with the outer peripheral surface of a downwardly extending wall portion of the valve seat 42. Furthermore, the seal portion 47 of the valve element 45 is assembled onto the retainer 46 in correspondence of the through-holes 42a of the valve seat 42. Although there are differences in arrangement, this three-way valve 50 operates in substantially the same manner as the three-way valve 40 shown in FIG. 7.

Figure 9:
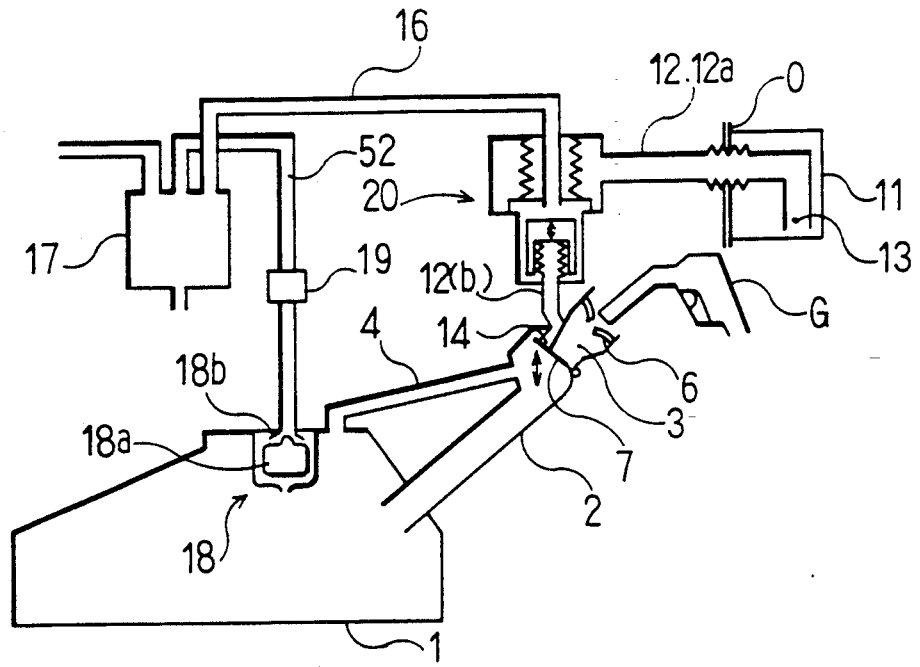
FIG. 9 is a schematic diagram in which a second fuel passage (for fuel vapor) is provided in the first embodiment.

In the first embodiment, a description has been given of a case where only one branch passage 16 is provided as a passage communicating with the canister 17. However, as shown in FIG. 9, a second fuel passage 52 communicating directly with the canister 17 from an upper portion of the fuel tank 1 may be provided. If this arrangement is provided, during non-fueling, i.e., when the fuel charging port 3 and the inlet 14 of the fuel passage 12 are closed by the trap door 7, the fuel vapor in the fuel tank 1 can be made to flow into the canister 17.

It should be noted that a fuel cutoff valve 18 is preferably provided at the junction between the second fuel passage 52 and the fuel tank 1. This fuel cutoff valve 18 is provided to ensure that the liquid fuel in the fuel tank 1 does not flow into the canister 17, but that only the fuel vapor flows into the canister 17. This fuel cutoff valve 18 is comprised of a float valve 18a and a seal portion 18b for the float valve 18a lifted by means of buoyancy.

Furthermore, a positive/negative pressure valve 19 is preferably provided in the second fuel passage 52 so as to permit adjustment of pressure within the fuel tank 1 during non-fueling.

Figure 10:
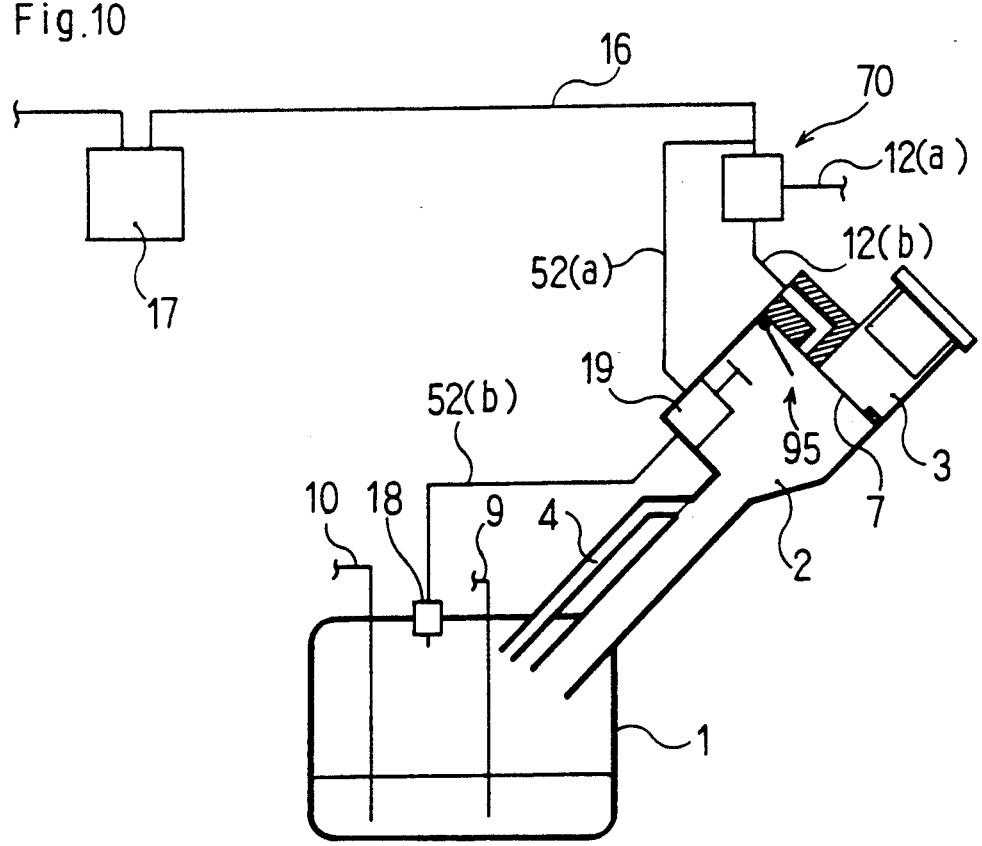
FIG. 10 is a schematic diagram in accordance with a second embodiment.
Figure 11:
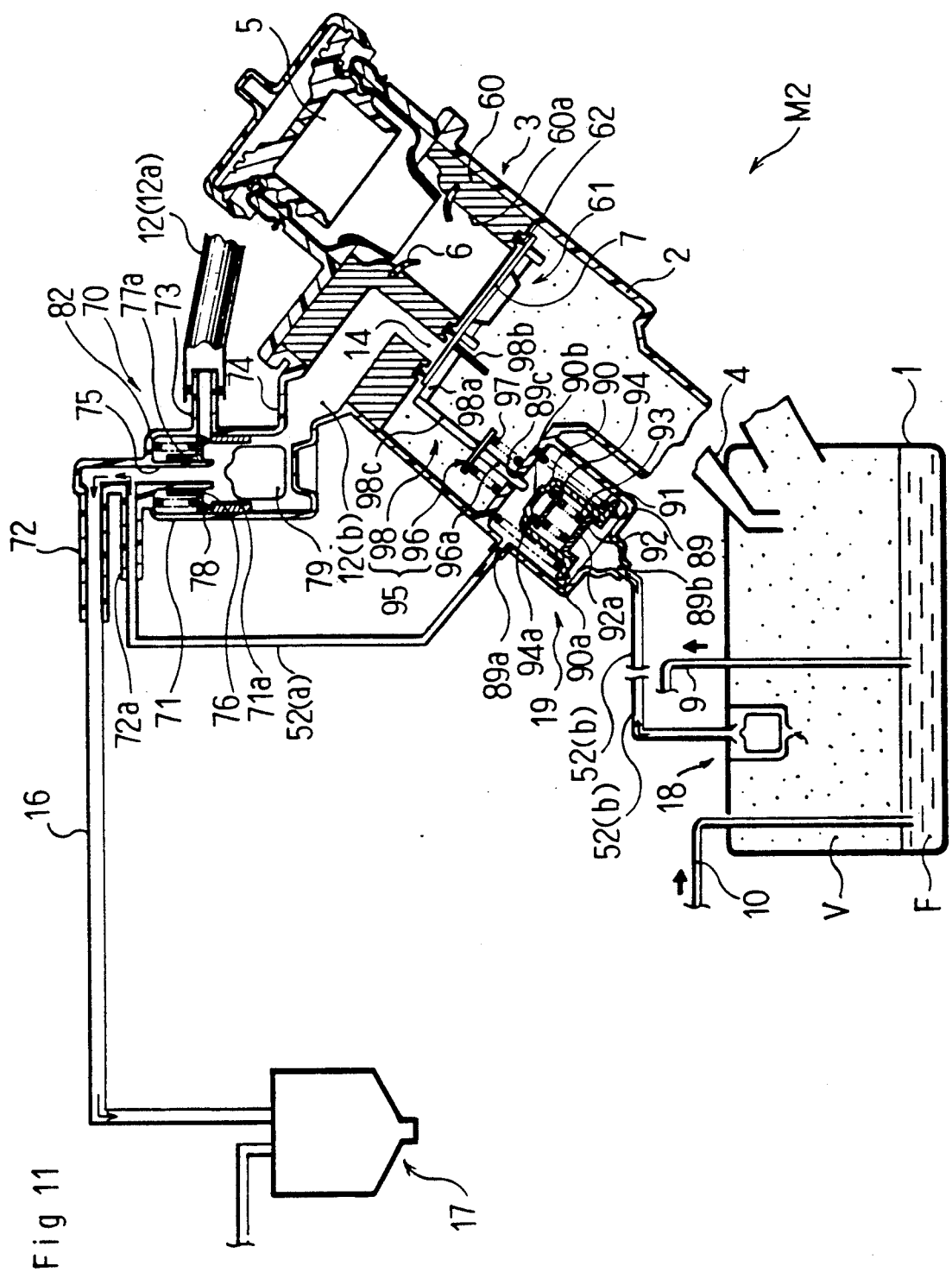
FIG. 11 is a schematic cross-sectional view of the second embodiment taken along the line XI—XI of FIG. 12.
Figure 12:
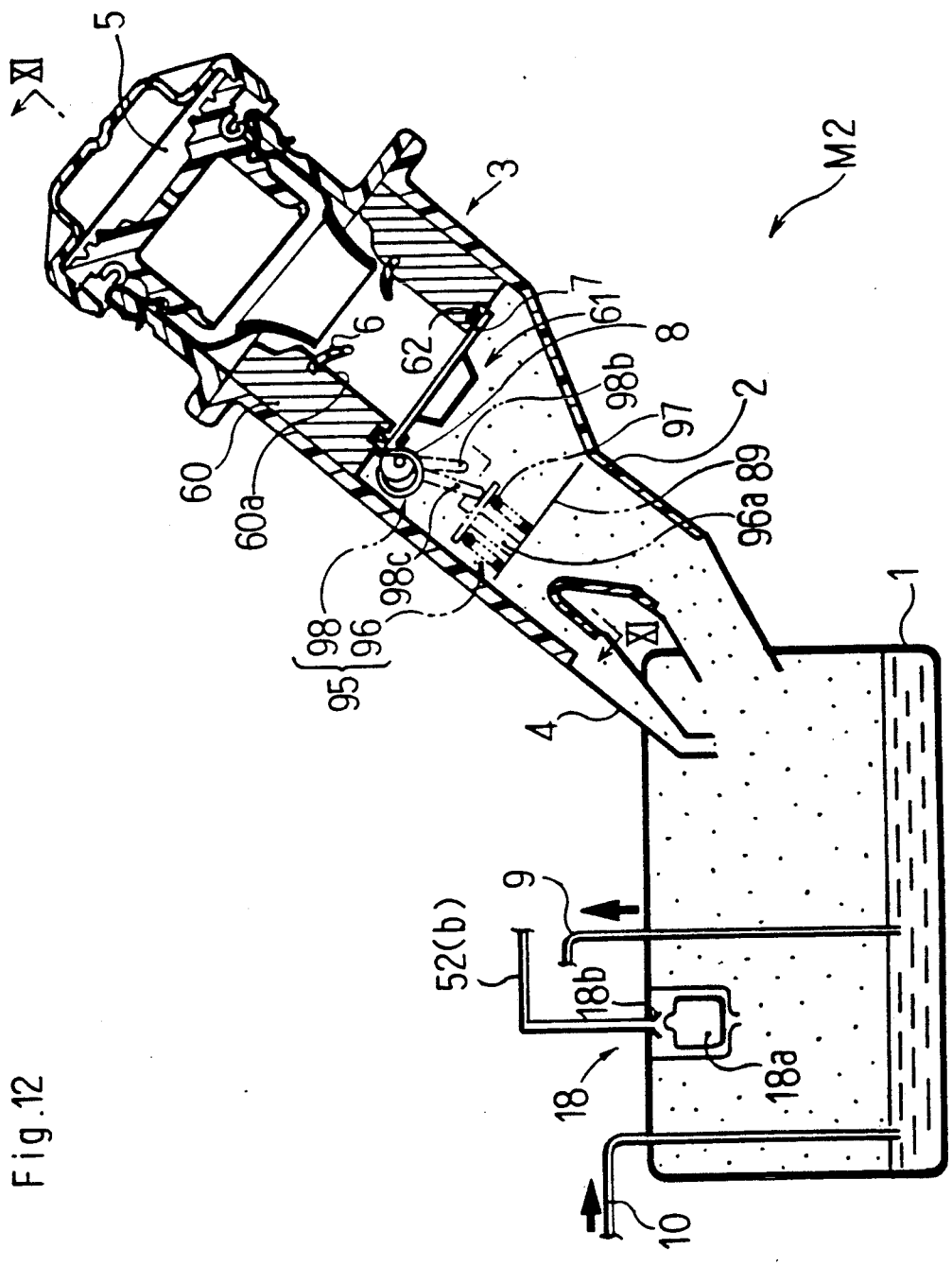
FIG. 12 is schematic cross-section view of the second embodiment taken from a different direction from that for FIG. 11.

A fuel tank system M2 in accordance with a second embodiment of the present invention is arranged such that the second fuel passage 52 connected to the canister 17 is connected to the branch passage 16, as shown in FIGS. 10-12. In addition, the fuel tank system M2 in accordance with the second embodiment is arranged such that the passage communicating with the canister 17 can be constituted by one branch passage 16. Furthermore, this fuel tank system is arranged such that the positive/negative pressure valve 19 disposed in the second fuel passage 52 is forcedly closed by a movement transmitting mechanism 95 during fueling.

With this fuel tank system M2, a closing portion 60 is provided in the fuel charging port 3. An insertion hole 60a is provided in the closing portion 60. The fuel recovery valve 6 is disposed on an inner peripheral surface of the insertion hole 60a. In addition, the inlet 14 of the first fuel passage 12 is formed in the closing portion 60. This first fuel passage 12 is designed to allow the liquid fuel overflowing during fueling to flow out from the rear surface side of the fuel lid 11.

Figure 13:
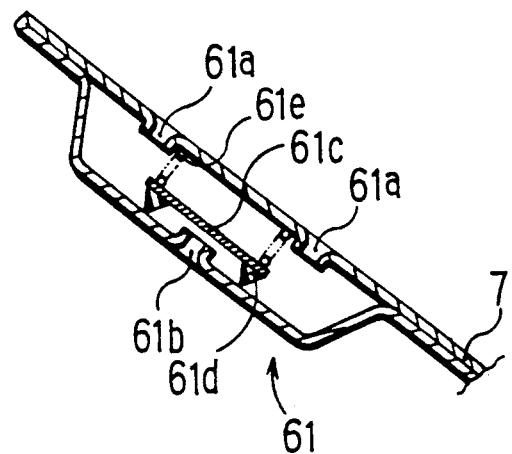
FIG. 13 is schematic cross-sectional view of a positive pressure valve disposed on a trap door used in the second embodiment.

The trap door 7 is pivotally mounted on a lower portion of the closing portion 60 at the filler neck 2. This trap door 7 is urged by a torsion spring 8 and is adapted to close the insertion hole 60a and the inlet 14 of the first fuel passage 12. A positive pressure valve 61 is disposed on the trap door 7, as shown in FIG. 13. This positive pressure valve 61 is provided to cope with a situation when the internal pressure of the fuel tank 1 has become abnormally high. This positive pressure valve 61 comprises insertion holes 61a, 61b, a valve plate 61c having a seal portion 61d, and a compression coil spring 61e.

Figure 14:
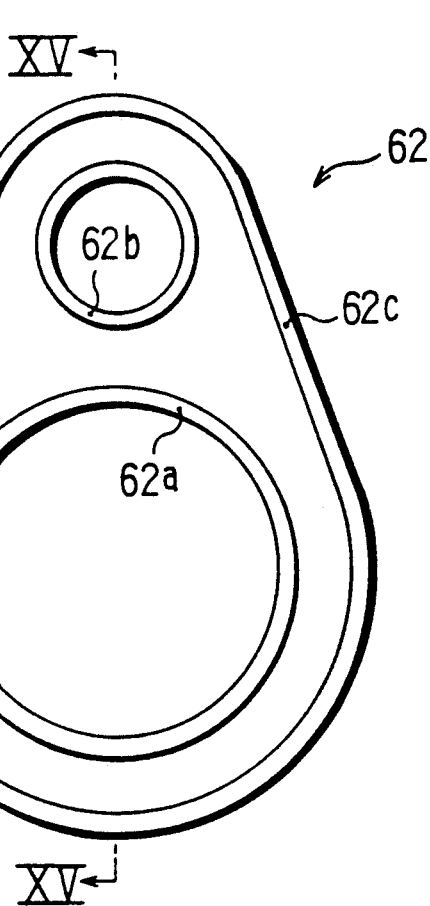
FIG. 14 is a bottom view of a seal member used in the second embodiment.
Figure 15:
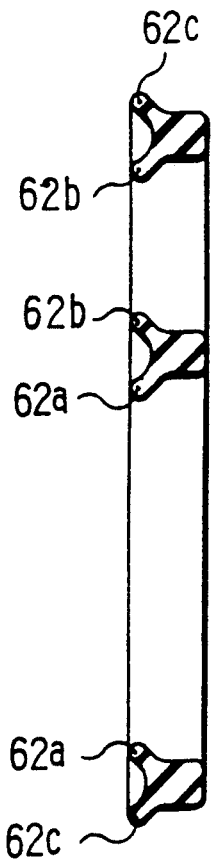
FIG. 15 is a cross-sectional view taken along the line XV—XV of FIG. 14.

In addition, the closing portion 60 is provided with a seal member 62 which is brought into contact with the trap door 7. This seal member 62 seals a peripheral edge of the insertion hole 60a and a peripheral edge of the inlet 14 of the fuel passage 12. This seal member 62 has seal lips 62a, 62b and a seal lip 62c disposed around an outer peripheral edge of the seal member 62, as shown in FIGS. 14 and 15. The seal lips 62a, 62b are disposed around the peripheral edge of the insertion hole 60a and the peripheral edge of the inlet 14 of the fuel passage 12. The trap door 7 is arranged such that the trap door 7 itself is opened when the internal pressure of the fuel tank 1 has become abnormally negative. The seal lips 62a, 62b maintain the sealing performance required when the fuel tank 1 is in that state of negative pressure, until immediately before the trap door 7 is opened. Meanwhile, the seal lip 62c maintains the sealing performance required when the fuel tank 1 is in the state of positive pressure, until immediately before the positive pressure valve 61 is actuated after the internal pressure of the fuel tank 1 has become abnormally high.

The first fuel passage 12 is provided with a three-way valve 70 at its branching point for the branch passage 16, in the same way as the first embodiment. In addition, the first fuel passage 12 communicates with the outlet 13 disposed in the rear surface of the fuel lid 11.

Figure 18:
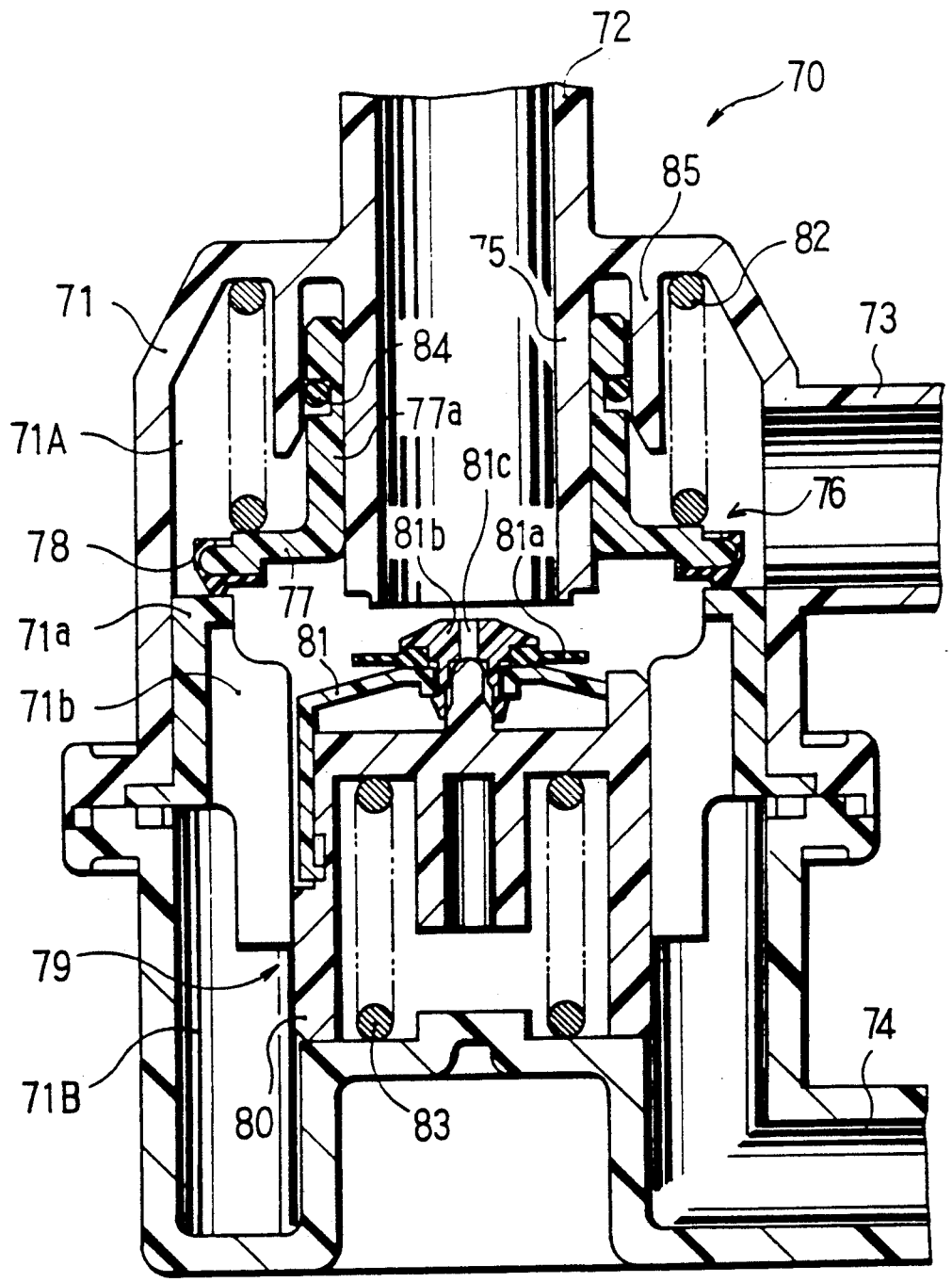
FIG. 18 is an enlarged cross-sectional view of a three-way valve used in the second embodiment.

This three-way valve 70 has a substantially cylindrically shaped case 71 whose peripheral walls are constituted by an upper side wall 71A and a lower side wall 71B, as shown in FIGS. 11 and 18. A nipple 72 is formed on an upper portion of the case 71 as a connecting portion connected to the branch passage 16. In addition, a nipple portion 72a connected to the second fuel passage 52 is formed on the nipple 72. A nipple 73 is formed on a side portion of the case 71 as a connecting portion connected to the passage 12a on the fuel lid 11 side of the fuel passage 12. A nipple 74 is formed on a lower portion of the case 71 as a connecting portion connected to the passage 12b on the fuel tank 1 side of the fuel passage 12. In addition, a downwardly extending cylindrical portion 75 is formed on an inner peripheral surface of an upper portion of the case 71 in such a manner as to communicate with the branching-side nipple 72.

A liquid-fuel valve 76 and a float valve 79 are disposed in the case 71.

The liquid-fuel valve 76 is disposed in such a manner as to extend from the vicinity of the inner peripheral surface of the case 71 corresponding to a lower portion of the lid-side nipple 73 to an outer peripheral surface of the cylindrical portion 75. That is, this liquid-fuel valve 76 is disposed in such a manner as to shut off communication between the space in the cylindrical portion 75 and the space in the lid-side nipple 72.

The liquid-fuel valve 76 comprises a substantially annular retainer 77 and an annular seal portion 78 made of rubber. The retainer 77 has a cylindrical portion 77a on its inner peripheral side. The seal portion 78 is provided to the underside of an outer peripheral edge of the retainer 77.

The liquid-fuel valve 76 is pressed downwardly by means of a compression coil spring 82. Hence, the liquid-fuel valve 76 causes the seal portion 78 to be held in close contact with an upper surface of a stepped portion 71a formed on the inner peripheral surface of the case 71, by means of the spring 82. This stepped portion 71a is provided on the inner peripheral surface of the case 71 over the entire circumference thereof at a position corresponding to a lower portion of the lid-side nipple 73. A plurality of ribs 71b are formed on an inner peripheral surface of the stepped portion 71a. The ribs 71b are designed to provide a space between the inner peripheral surface of the stepped position 71a and the float valve 79. An O-ring 84 is used to maintain gas-tightness between the cylindrical portion 77a and the cylindrical portion 75. This O-ring 84 is held in close contact with a second cylindrical portion 85 extending from an upper portion of the case 71 to a lower portion thereof.

The float valve 79 is disposed below the liquid-fuel valve 76. The float valve 79 is urged upwardly by means of a compression coil spring 83. This spring 83 is disposed on a bottom wall of the case 71.

The float valve 79 comprises a first float 80 and a second float 81. The reason for provision of the two float valves 80, 81 is to ensure smooth valve opening after valve closing. The second float 81 is retained on an outer peripheral surface of the first float 80 in such a manner as to be vertically movable. An annular valve element 81a is assembled onto the second float 81 by making use of a clip 81b. The clip 81b is provided with a small hole 81c.

When the liquid fuel has entered the interior of the case 71 through the tank-side nipple 74, the float valve 79 is lifted as the level of the liquid fuel rises. The float valve 79 then brings the valve element 81a into contact with the cylindrical portion 75. As a result, the float valve 79 closes the cylindrical portion 75 communicating with the branch passage 16. Subsequently, as the amount of the liquid fuel supplied begins to be reduced and its level begins to be lowered, the first float 80 is lowered, thereby causing the valve element 81a to be spaced apart from the cylindrical portion 75. The float valve 79 is arranged so as to operate as described above.

A positive/negative pressure valve 19 disposed in the second fuel passage 52 in accordance with the second embodiment is disposed in a case 89 formed in the filler neck 2.

Figure 19:
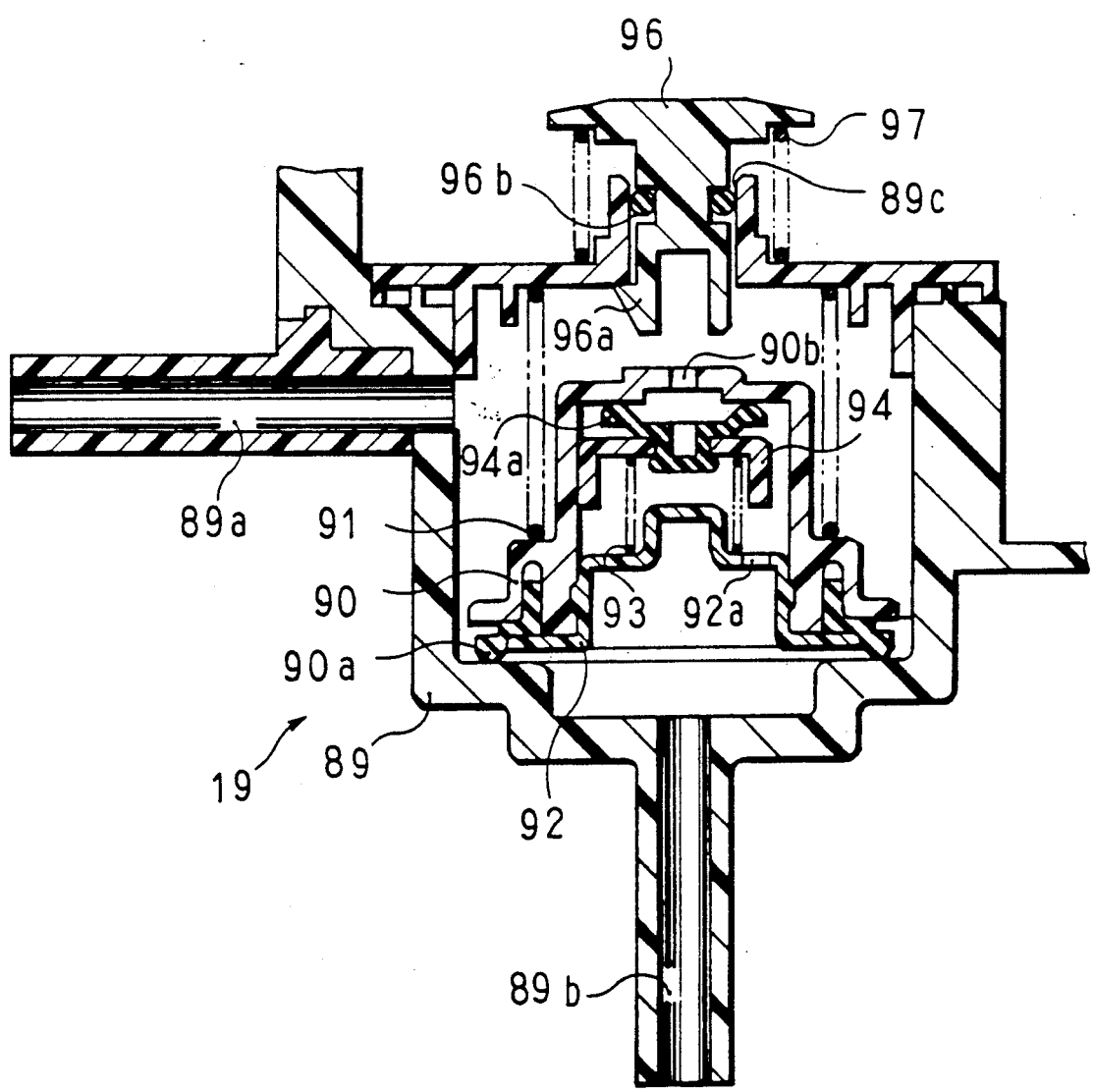
FIG. 19 is a enlarged cross-sectional view of a positive/negative pressure valve used in the second embodiment.

Two nipples 89a, 89b are formed on the case 89 as connecting portions connected to predetermined portions, respectively. The nipple 89a is connected to a passage 52a on the canister side of the second fuel passage 52. The nipple 89b is connected to a passage 52b on the fuel tank side of the second fuel passage 52. An insertion hole 89c is formed in a wall of the case 89 opposing the nipple 89b. A rod 96a of a pressing member 96, which will be described later, is inserted in the insertion hole 89c (see FIG. 19).

A valve element 90 is disposed in the case 89. This valve element 90 is urged by a compression coil spring 91. The valve element 90 is adapted to close the tank-side passage 52b of the second fuel passage 52 and functions as a valve element for positive pressure.

The valve element 90 has a substantially cylindrical configuration with a bottom and has on its lower portion a seal 90a abutting against a peripheral edge of the nipple 89b. A through-hole 90b is formed in an upper portion of the valve element 90.

A valve plate 94 is disposed at an inner peripheral position of the valve element 90. This valve plate 94 is urged by a compression coil spring 93. The valve plate 94 is adapted to close the through-hole 90b by means of the spring 93 and functions as a valve plate for negative pressure. A seal 94a abuts against a peripheral edge of the through-hole 90b. In addition, a spring seat 92 is provided with the valve element 90 and is provided with a through-hole 92a.

The pressing member 96 together with a cam member 98, which will be described later, constitutes a movement transmitting mechanism 95. The movement transmitting mechanism 95 is adapted to forcedly close the positive/negative pressure valve 19 (particularly the positive pressure valve 90) in interlocking relationship with the opening movement of the trap door 7. The pressing member 96 is constantly urged by a coil spring 97. The urging direction of the spring 97 is the direction in which the rod 96a is withdrawn upwardly through the insertion hole 89c. The rod 96a is adapted to press the valve element 90 downwardly when the pressing member 96 is pressed downwardly. It should be noted that the through-hole 90b of the valve element 90 is not closed even when the rod 96a is brought into contact with the valve element 90. In addition, a seal 96b is held in contact with an inner peripheral surface of the insertion hole 89c and is fitted over an outer peripheral surface of the rod 96a.

The cam member 98 has a camshaft 98a which is pivotally supported under the closing portion 60 in other words on the fuel tank 1 side. Arms 98b, 98c are provided on opposite ends of the camshaft 98a in such a manner as to project therefrom. The arm 98c abuts against an upper portion of the pressing member 96. The arm 98b is disposed at a position where the arm 98b is pushed by the trap door 7 when the trap door 7 is opened. The time when the trap door 7 is opened is the time when the fuel nozzle G is inserted into the fuel charging port 3. When the arm 98b is pushed, the arm 98c rotates as the camshaft 98a rotates. As a result, the arm 98c is capable of pressing the pressing member 96.

Figure 21:
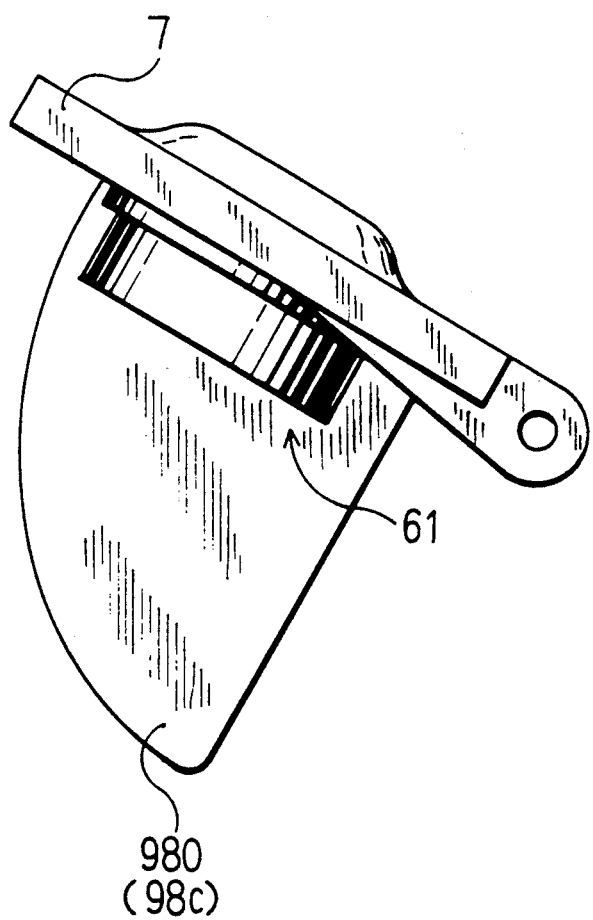
FIG. 21 is a diagram illustrating a modification of a cam member used in the second embodiment.

It should be noted that the cam member for pressing the pressing member 96 may be arranged as shown in FIG. 21. This cam member 980 is arranged such that the already-mentioned arm 98c is formed integrally with the trap door 7.

With the fuel tank system M2 in accordance with this second embodiment, when the liquid fuel F is not being supplied, the trap door 7 is not opened and the movement transmitting mechanism 95 is not actuated. Consequently, the fuel vapor V in the fuel tank 1 enters the positive/negative valve 19 via the fuel cutoff valve 18 and the tank-side passage 52b of the second fuel passage 52, as shown in FIGS. 11 and 12. The valve element 90 is moved inside the case 89 of the positive/negative pressure valve 19 by means of the pressure of the fuel vapor V in such a manner as to move the seal 90a away from the peripheral edge of the nipple 89b, so as to become open. As a result, the fuel vapor V flows into the nipple 89a through the space between the seal 90a and the case 89, and then into the canister-side passage 52a of the second fuel passage 52. Then, the fuel vapor V passes through the nipple portion 72a of the three-way valve 70, the nipple 72, and the branch passage 16, and flows into the canister 17.

It should be noted that the above-described operation takes place in a case when the internal pressure of the fuel tank 1 is positive as compared to that of the canister-side passage 52a of the second fuel passage 52.

Meanwhile, when the internal pressure of the fuel tank 1 has become negative as compared to that of the canister-side passage 52a of the second fuel passage 52, the fuel tank system M2 operates as follows: First, in the positive/negative pressure valve 19, the valve plate 94 is lowered against the urging force of the coil spring 93. Then, a gas is created between the seal 94a of the valve plate 94 and the valve element 90. Consequently, the gas in the passage 52a flows through the tank-side passage 52b into the fuel tank 1 via the nipple 89a, the through-hole 90b, the gas between the seal 94a and the valve element 90, the through-hole 92a, and the nipple 89b in the order mentioned. As a result, the internal pressure of the fuel tank 1 is adjusted.

Figure 16:
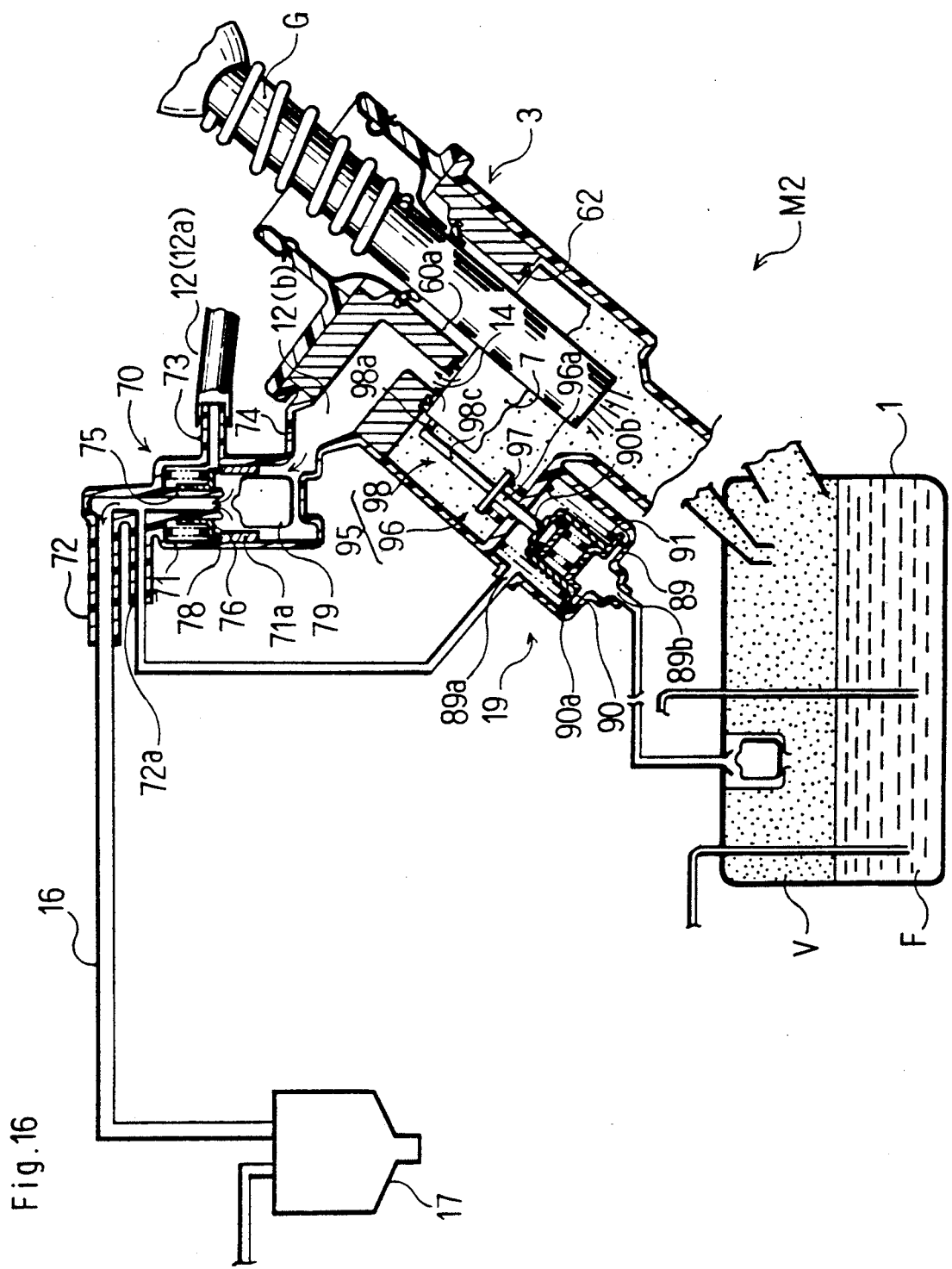
FIG. 16 is a schematic cross-sectional view of the second embodiment during fueling.
Figure 17:
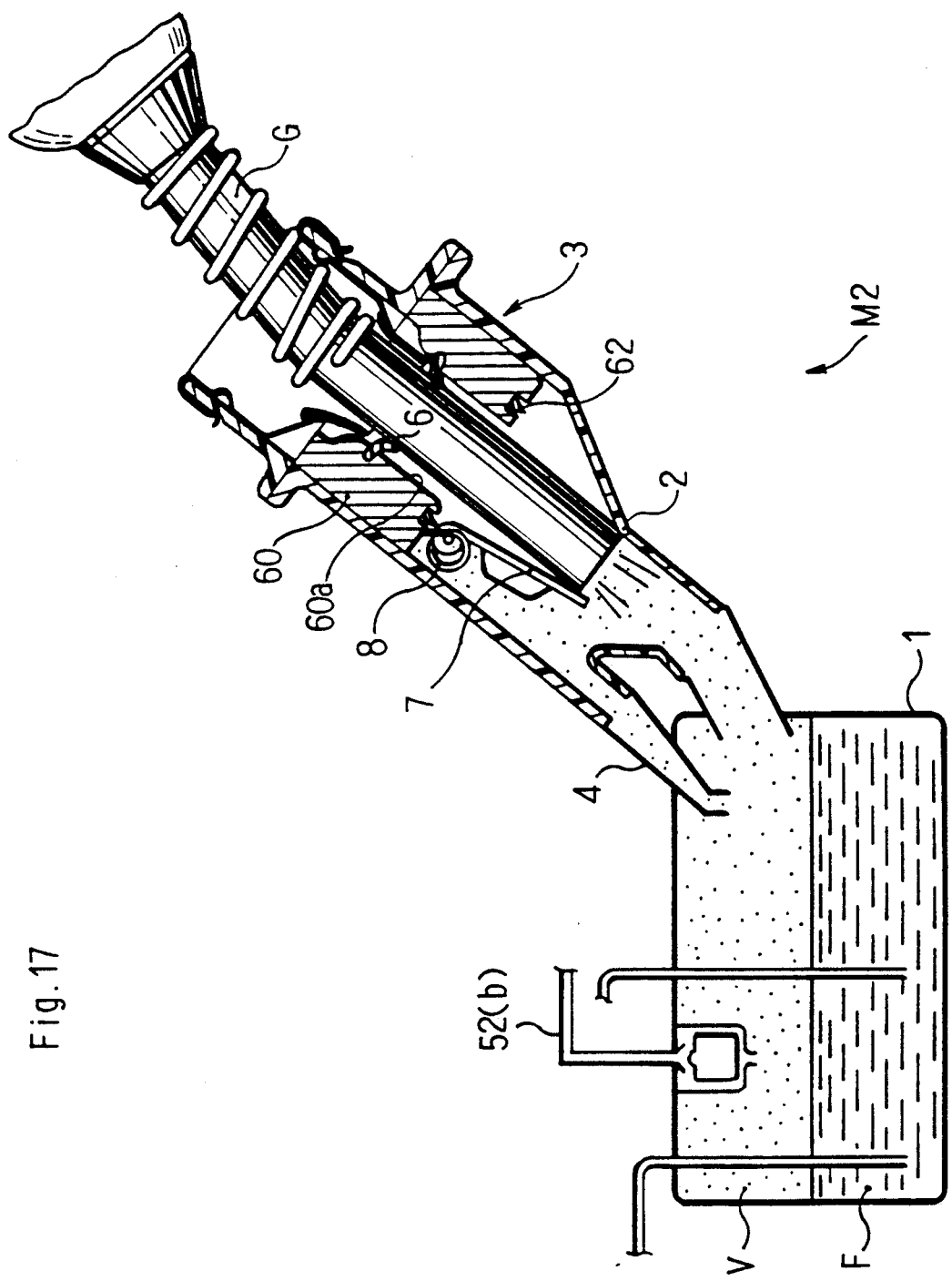
FIG. 17 is a schematic cross-sectional view of the second embodiment during fueling, the view being taken from a different direction from that for FIG. 16.

At a time when the liquid fuel is supplied, the fuel nozzle G is inserted into the fuel charging port 3, as shown in FIGS. 16 and 17. Then, the trap door 7 is opened, and the inlet 14 of the first fuel passage 12 is opened. In addition, the arm 98b of the cam member 98 is pushed by the trap door 7, thereby rotating the camshaft 98a. Then, as the camshaft 98a rotates, the arm 98c presses the pressing member 96. Thus, the movement transmitting mechanism 95 is operated. Subsequently, as the pressing member 96 is pressed, the rod 96a presses the valve element 90 of the positive/negative pressure valve 19 so as to close the peripheral edge of the tank-side nipple 89b. The tank-side passage 52b is then closed. Consequently, the fuel vapor V which is produced in large quantities during fueling flows through the breather tube 4 into the first fuel passage 12 (12b) without flowing through the second fuel passage 52. Then, the fuel vapor V enters the interior of the case 71 of the three-way valve 70 via the nipple 74, and after flowing through the gap between the stepped portion 71a and the float valve 79, the cylindrical portion 75, and the nipple 72 in the order mentioned, the fuel vapor V flows into the branch passage 16 and then into the canister 17.

Figure 2:
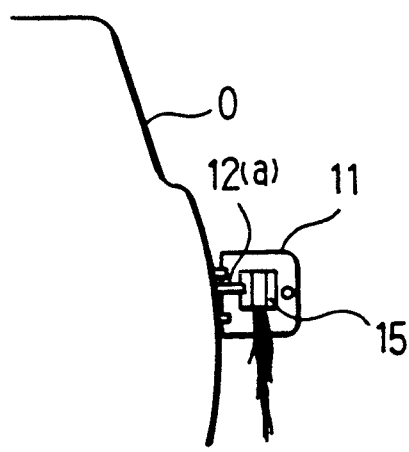
FIG. 2 is a front elevational view illustrating a fuel lid of the first embodiment.

Furthermore, when the liquid fuel is supplied and the state of overfueling is reached, the float valve 18a of the fuel cutoff valve 18 first closes the second fuel passage 52 (52b). Specifically, this closure is effected as the float valve 18a is lifted by its buoyancy and is brought into close contact with the seal portion 18b. Subsequently, the liquid fuel flows through the inlet 14 into the first fuel passage 12 (12b), and enters the interior of the case 71 of the three-way valve 70 through the tank-side nipple 74. Then, the float valve 79 is lifted as the level of the liquid fuel rises, thereby closing the branch passage 16. Specifically, this closure if effected as the valve element 81a is brought into contact with the cylindrical portion 75. Furthermore, as more liquid fuel enters the interior of the case 71, the liquid-fuel valve 76 is spaced apart from the upper surface of the stepped portion 71a against the urging force of the coil spring 82. Consequently, the liquid fuel passages through the gas between the liquid-fuel valve 76 and the stepped portion 71a and enters the passage 12a of the first fuel passage 12 via the lid-side nipple 73. Then, the liquid fuel flows out through the outlet 13 via the accumulator 15, as shown in FIG. 2.

It should be noted that with the fuel tank system M2 in accordance with this second embodiment the fuel vapor V which is produced in large quantities during fueling can be made to flow into the canister 17 through the branch passage 16 with the second fuel passage 52 closed. In this arrangement, a changeover valve such as the one described in Japanese Utility Model Laid-Open No. 96336/1989 is not provided separately as a means for closing the second fuel passage 52. That is, the closure of the second fuel passage 52 is effected by providing the movement transmitting mechanism 95 so as to forcedly close the positive/negative pressure valve 19 (particularly the positive pressure valve 90) provided in the second fuel passage 52. Accordingly, the process of assembling the changeover valve and the process for ensuring the sealing state become unnecessary as compared with the case where the changeover valve is used as disclosed in the aforementioned publication. In other words, with this fuel tank system M2 it becomes possible to reduce the number of manufacturing processes and manufacturing cost as compared with the fuel tank system disclosed in Japanese Utility Model Laid-Open No. 96336/1989.

It should be noted that in the second embodiment an arrangement has been shown in which the pressing member 96 and the cam member 98 are used as the movement transmitting mechanism 95. However, as the movement transmitting mechanism, a link mechanism or a gear mechanism may be alternatively employed insofar as such a mechanism is capable of pressing the valve element 90 of the positive/negative pressure valve 19.

In addition, with the fuel tank system M2 in accordance with the second embodiment, the seal member 62 is disposed on the closing member 60 which is brought into contact with the trap door 7. This seal member 62 is of a double-lip type provided with the predetermined seal lips 62a, 62b, 62c for positive and negative pressure. Consequently, it is possible to maintain a high degree of sealing performance between the trap door 7 and the closing member 60 until immediately between the internal pressure of the fuel tank 1 becomes abnormally positive or negative. Incidentally, in a case when only the seal lips 62a, 62b for coping with the negative pressure within the fuel tank 1 are provided for the seal member 62, the following drawback occurs. Namely, seal leakage takes place before the internal pressure of the fuel tank 1 becomes abnormally positive. Alternatively, in a case when only the seal lip 62c for coping with the positive pressure within the fuel tank 1 is provided for the seal member 62, the following drawback occurs. Namely, seal leakage takes place before the internal pressure of the fuel tank 1 becomes abnormally negative. Accordingly, if the seal member 62 is formed into the double-lip type, it is possible to obtain sufficient sealing performance.

Figure 20:
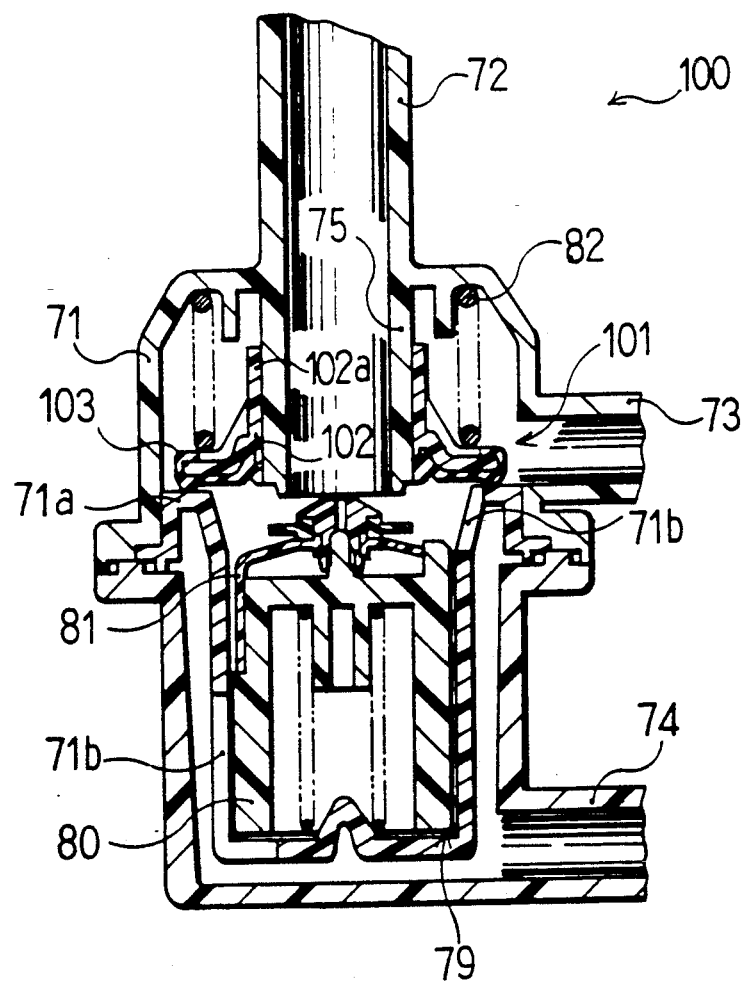
FIG. 20 is a cross-sectional view illustrating a modification of the three-way valve.

Furthermore, with the three-way valve 70 in accordance with the second embodiment, two members, i.e., the seal portion 78 and the O-ring 84, are used in the liquid-fuel valve 76. These members are adapted to shut off communication between the space in the cylindrical portion 75 and the space in the lid-side nipple 73. However, it is possible to employ a three-way valve 100 shown in FIG. 20 in which one seal portion 103 is used. This seal portion 103 is provided to the underside of a retainer 102 of a liquid-fuel valve 101 over the inner and outer peripheries thereof. The seal portion 103 is adapted to bring the inner periphery of the retainer 102 into close contact with the cylindrical portion 75, and the outer periphery thereof into close contact with the upper surface of the stepped portion 71a secured to the inner peripheral surface of the case 71. In the drawing, reference numeral 71b denotes the through-hole formed in the stepped portion 71a.

What is claimed is:

1. A fuel tank system, comprising:
   (a) a fuel tank disposed in a body;
   (b) a fuel charging port extending from said fuel tank and disposed in the vicinity of an outer panel of said body;
   (c) a fuel lid disposed in such a manner as to cover said fuel charging port and mounted in such a manner that said fuel lid is movable substantially horizontally relative to a portion of said outer panel of said body corresponding to said fuel charging port and that a distal end of said fuel lid is capable of moving away from said fuel charging port and said outer panel; and
   (d) a fuel passage having an outlet disposed on a rear surface side of said fuel lid in such a manner as to be oriented downwardly, said fuel passage extending from said fuel tank and adapted to allow a liquid fuel overflowing during overfueling to flow.

2. A fuel tank system according to claim 1, further comprising a fuel recovery valve disposed on an inner peripheral surface of said fuel charging port and adapted to close a space between said inner peripheral surface and a fuel nozzle inserted into said fuel charging port during fueling.

3. A fuel tank system according to claim 1, wherein an outlet side of said fuel passage is formed to be substantially transparent.

4. A fuel tank system according to claim 1, further comprising an accumulator disposed on a rear surface of said fuel lid at a position immediately before said outlet of said fuel passage.

5. A fuel tank system according to claim 4, wherein said accumulator is formed to be substantially transparent.

6. A fuel tank system according to claim 1, wherein a branch passage is formed midway in said fuel passage, a canister is connected to an outlet of said branch passage, and a three-way valve is disposed at a junction between said fuel passage and said branch passage, said three-way valve allowing the liquid fuel to flow into said outlet on a fuel lid side and allowing only fuel vapor to flow to said branch passage.

7. A fuel tank system according to claim 6, wherein said three-way valve comprises:
   (a) a case constituting a peripheral wall;
   (b) a branching-side connecting portion formed on an upper portion of said case and connected to said branch passage;
   (c) a lid-side connecting portion formed on a side portion of said case and connected to a fuel lid side of said fuel passage;
   (d) a tank-side connecting portion formed in a lower portion of said case and connected to a fuel tank side of said fuel passage;
   (e) a cylindrical portion extending downwardly from an inner peripheral surface of an upper portion of said case and communicating with said branching-side connecting portion;
   (f) a liquid-fuel valve which extends from an inner peripheral surface of said case corresponding to a lower portion of said lid-side connecting portion to an outer peripheral surface of said cylindrical portion, shuts off communication between a space in said cylindrical portion and a space in said lid-side connecting portion, and cancels the closing state when the liquid fuel has entered through said tank-side connecting portion; and
   (g) a float valve which is disposed below said liquid-fuel valve inside said case with a space provided between said float valve and an inner peripheral surface of a lower portion of said case, and is lifted as a level of said liquid fuel rises when the liquid fuel has entered through said tank-side connecting portion, so as to shut off communication between a space in the lower portion of said case and a space in said cylindrical portion.

8. A fuel tank system, comprising:
   (a) a fuel tank disposed in a body;
   (b) a filler neck extending diagonally upwardly from an upper portion of said fuel tank;
   (c) a fuel charging port disposed in an upper portion of said filler neck and in the vicinity of an outer panel of said body;
   (d) a fuel lid disposed in such a manner as to cover said fuel charging port and mounted in such a manner that said fuel lid is movable substantially horizontally relative to a portion of said outer panel of said body corresponding to said fuel charging port and that a distal end of said fuel lid is capable of moving away from said fuel charging port and said outer panel;
   (e) a fuel recovery valve disposed on an inner peripheral surface of said fuel charging port and adapted to close a space between said inner peripheral surface and a fuel nozzle inserted into said fuel charging port during fueling;
   (f) a fuel passage having an inlet connected to said filler neck at a lower portion of said fuel recovery valve and an outlet disposed on a rear surface side of said fuel lid in such a manner as to be oriented downwardly, said fuel passage being provided to allow a liquid fuel overflowing during overfueling to flow;
   (g) a branch passage formed midway in said fuel passage;
   (h) a canister connected to an outlet of said branch passage;
   (i) a three-way valve disposed at a junction between said fuel passage and said branch passage and adapted to allow the liquid fuel to flow into said outlet on a fuel lid side and allow only fuel vapor to flow to said branch passage;

(j) a trap door disposed in a lower portion of said inlet of said fuel passage in said filler neck and adapted to close said inlet of said fuel passage and said fuel charging port, and open said inlet of said fuel passage and said fuel charging port by means of said fuel nozzle inserted in said fuel charging port; and (k) a breather tube having one end connected to said filler neck at a position below said trap door and the other connected to an upper portion of said fuel tank via a separate route.

9. A fuel tank system according to claim 8, wherein said three-way valve comprises:

(a) a case constituting a peripheral wall;

(b) a branching-side connecting portion formed on a upper portion of said case and connected to said branch passage;

(c) a lid-side connecting portion formed on a side portion of said case and connected to a fuel lid side of said fuel passage;

(d) a tank-side connecting portion formed in a lower portion of said case and connected to a fuel tank side of said fuel passage;

(e) a cylindrical portion extending downwardly from an inner peripheral surface of an upper portion of said case and communicating with said branching-side connecting portion;

(f) a liquid-fuel valve which extends from an inner peripheral surface of said case corresponding to a lower portion of said lid-side connecting portion to an outer peripheral surface of said cylindrical portion, shuts off communication between a space in said cylindrical portion and a space in said lid-side connecting portion, and cancels the closing state when the liquid fuel has entered through said tank-side connecting portion; and (g) a float valve which is disposed below said liquid-fuel valve inside said case with a space provided between said float valve and an inner peripheral surface of a lower portion of said case, and is lifted as a level of said liquid fuel rises when the liquid fuel has entered through said tank-side connecting portion, so as to shut off communication between a space in the lower portion of said case and a space in said cylindrical portion.

10. A fuel tank system according to claim 8, wherein a second fuel passage connected to said canister is connected to the upper portion of said fuel tank, and a fuel cutoff valve is disposed at a junction between said second fuel passage and said fuel tank, said fuel cutoff valve permitting the passage of the fuel vapor in said fuel tank to said canister by preventing the passage of the liquid fuel in said fuel tank to said canister.

11. A fuel tank system according to claim 10, wherein a positive/negative pressure valve for adjusting the internal pressure of said fuel tank is disposed in said second fuel passage.

12. A fuel tank system, comprising:

(a) a fuel tank disposed in a body;

(b) a filler neck extending diagonally upwardly from an upper portion of said fuel tank;

(c) a fuel charging port disposed in an upper portion of said filler neck and in the vicinity of an outer panel of said body;

(d) a fuel lid disposed in such a manner as to cover said fuel charging port and mounted in such a manner that said fuel lid is movable substantially horizontally relative to a portion of said outer panel of said body corresponding to said fuel charging port and that a distal end of said fuel lid is capable of moving away from said fuel charging port and said outer panel;

(e) a fuel recovery valve disposed on an inner peripheral surface of said fuel charging port and adapted to close a space between said inner peripheral surface and a fuel nozzle inserted into said fuel charging port during fueling;

(f) a first fuel passage having an inlet connected to said filler neck at a lower portion of said fuel recovery valve and an outlet disposed on a rear surface side of said fuel lid in such a manner as to be oriented downwardly, said first fuel passage being provided to allow a liquid fuel overflowing during overfueling to flow;

(g) a branch passage formed midway in said first fuel passage;

(h) a canister connected to an outlet of said branch passage;

(i) a three-way valve disposed at a junction between said first fuel passage and said branch passage and adapted to allow the liquid fuel to flow into said outlet on a fuel lid side and allow only fuel vapor to flow to said branch passage;

(j) a trap door disposed in a lower portion of said inlet of said first fuel passage in said filler neck and adapted to close said inlet of said first fuel passage and said fuel charging port, and open said inlet of said first fuel passage and said fuel charging port by means of said fuel nozzle inserted in said fuel charging port;

(k) a breather tube having one end connected to said filler neck at a position below said trap door and the other connected to an upper portion of said fuel tank via a separate route;

(l) a second fuel passage having one end connected to the upper portion of said fuel tank and the other connected to said branch passage;

(m) a fuel cutoff valve disposed at a junction between said second fuel passage and said fuel tank and adapted to permit the passage of the fuel vapor in said fuel tank to said canister by preventing the passage of the liquid fuel in said fuel tank to said canister;

(n) a positive/negative pressure valve disposed in said second fuel passage so as to adjust the internal pressure of said fuel tank; and (o) a movement transmitting means for forcedly closing said positive/negative pressure valve when said trap door is opened.

13. A fuel tank system according to claim 12, wherein said three-way valve comprises:

(a) a case constituting a peripheral wall;

(b) a branching-side connecting portion formed on an upper portion of said case and connected to said branch passage;

(c) a lid-side connecting portion formed on a side portion of said case and connected to a fuel lid side of said fuel passage;

(d) a tank side connecting portion formed in a lower portion of said case and connected to a fuel tank side of said fuel passage;

(e) a cylindrical portion extending downwardly from an inner peripheral surface of an upper portion of said case and communicating with said branching-side connecting portion;

(f) a liquid-fuel valve which extends from an inner peripheral surface of said case corresponding to a lower portion of said lid-side connecting portion to an outer peripheral surface of said cylindrical portion, shuts off communication between a space in said cylindrical portion and a space in said lid-side connecting portion, and cancels the closing state when the liquid fuel has entered through said tank-side connecting portion; and (g) a float valve which is disposed below said liquid-fuel valve inside said case with a space provided between said float valve and an inner peripheral surface of a lower portion of said case, and is lifted as a level of said liquid fuel rises when the liquid fuel has entered through said tank-side connecting portion, so as to shut off communication between a space in the lower portion of said case and a space in said cylindrical portion.

14. A fuel tank system according to claim 12, wherein said positive/negative pressure valve comprises:

(a) a case having at its lower portion a tank-side connecting portion connected to the fuel tank side of said second fuel passage and having at its side portion a branching-side connecting potion connected to the branch passage side of said second fuel passage;

(b) a valve element for positive pressure which is capable of closing a peripheral edge of said tank-side connecting portion inside said case so as to cancel the closing state when the internal pressure of said fuel tank has become positive;

(c) a valve plate for negative pressure which is disposed between a peripheral edge of said tank-side connecting portion inside said case and said valve element, is capable of closing a through-hole provided in said valve element so as to cancel the closing state when the internal pressure of said fuel tank has become negative.

15. A fuel tank system according to claim 14, wherein said movement transmitting means comprises:

(a) a cam member for rotating when said trap door is opened; and (b) a pressing portion which is disposed in such a manner as to be inserted in said case of said positive/negative pressure valve and is adapted to press said valve element in such a manner as to forcedly close the peripheral edge of said tank-side connecting portion without closing said through-hole provided in said valve element of said positive/negative pressure valve, by means of the rotation of said cam member.

* * * * *